United States Patent [19]

Islam

[11] Patent Number: 5,446,902
[45] Date of Patent: Aug. 29, 1995

[54] METHOD FOR IMPLEMENTING COMPUTER APPLICATIONS IN AN OBJECT ORIENTED MANNER USING A TRADITIONAL NON-OBJECT ORIENTED PROGRAMMING LANGUAGE

[75] Inventor: Nayeem Islam, Mountain View, Calif.

[73] Assignee: Sun Microsystems, Inc., Mountain View, Calif.

[21] Appl. No.: 91,536

[22] Filed: Jul. 14, 1993

Related U.S. Application Data

[63] Continuation of Ser. No. 515,427, Apr. 27, 1990, abandoned.

[51] Int. Cl.$^6$ ............................................... G06F 7/00
[52] U.S. Cl. .................................. 395/700; 395/650; 395/600; 364/DIG. 1; 364/282.1
[58] Field of Search .................. 364/DIG. 1, DIG. 2

[56] References Cited

U.S. PATENT DOCUMENTS

| | | | |
|---|---|---|---|
| 4,766,534 | 8/1988 | DeBenedictis | 364/200 |
| 4,791,550 | 12/1988 | Stevenson et al. | 364/200 |
| 5,057,996 | 10/1991 | Cutler et al. | 364/DIG. 1 |
| 5,095,522 | 3/1992 | Fujita et al. | 364/DIG. 1 |
| 5,119,475 | 6/1992 | Smith et al. | 395/156 |
| 5,133,068 | 7/1992 | Crus et al. | 395/600 |
| 5,133,070 | 7/1992 | Barker et al. | 395/650 |
| 5,133,075 | 7/1992 | Risch | 395/800 |

OTHER PUBLICATIONS

Nayeem Islam, *The XView Interface Toolkit Object Model*, Proceedings of the Spring 1990 EUUG Conference, Munich Germany, Apr. 23–37, 1990.
Tor Hauge, *Event-Driven User Interfaces Based on Quasi-Parallelism*, Proceedings of the ACM Sigraph Symposium on User Interface, Banff, Albert (Canada), Oct. 7, 1988.
McCormack J. et al., *Using the X Toolkit or How To Write A Widget*, Proceedings, Summer USENIX '88, San Francisco, Calif., Jun. 20, 1988.
Andrew J. Palay, *The Andrew Toolkit-An Overview*, Proceedings of the Winter 1988 USENIX Conference, Dallas, Tex., Feb. 8, 1988.
Simplicity and Productivity (The X Toolkit), Unix Review vol. V6, Issue: N9 Pagination: P56(6), Publication Date Sep., 1988.

*Primary Examiner*—Kevin A. Kriess
*Assistant Examiner*—Lucien Toplu
*Attorney, Agent, or Firm*—Blakely Sokoloff Taylor & Zafman

[57] ABSTRACT

An object oriented application comprising an hierarchy of application classes, each having a plurality of class methods, is created from a toolkit having a static class hierarchy including a number of standard classes, a number of public interface methods with interfacing attributes and a list for chaining class private methods to the public interface methods, a plurality of class definition source and header files defining the extended application classes, a plurality of class method source and header files implementing the class methods of the extended classes, and a plurality of object user source and header files implementing the object users, using a traditional programming language that provides no support for object oriented programming. Together, the various files cooperate to achieve data abstraction and inheritance of object oriented programming, when the various files are compiled, linked, executed.

7 Claims, 9 Drawing Sheets

WindowPrivate.h/* private to object Window */
/* superclass public header files: used by class implementors as well as class users. */
include GenericPublic.h
include DrawablePublic.h
include WindowPublic.h define WINDOW_PKG_PUBLIC(item) XV_PUBLIC(item)
define
WINDOW_PKG_PRIVATE(item)XV_PRIVATE(Window_private_struct,Xv_window_struct,item)
/* instance structure. Each instance of a window object has a copy of this */
typedef struct {
    Xv_window      public_self;/*back pointer to public struct */
    int      height,width;
    void      (*event_proc)();
} Window_private_struct;

WindowPublic.h/* public header file for defines */ include "genericPublic.h"    /* base class, root of class tree */
include "DrawablePublic.h"    /* hidden class */ extern Xv_pkg    xv_window_pkg
typedef Xv_opaque    Xv_Window;
define WINDOW    &xv_window_pkg
/*choose unique id identifying this class -- requires knowledge of superclass ids */
define ATTR_PKG_Window    (ATTR_PKG_UNUSED-1)
define WINDOW_ATTR(type,ordinal)    ATTR(ATTR_PKG_WINDOW,type,ordinal)
/* required only by someone subclassing the Window Class : this is where the subclassing
is occuring. note the pointer to the parent structure */
typdef struct {
    Xv_drawable_struct    parent_data
    XV_opaque    private_data;
} Xv_window_struct;

/* attributes defining programming interface of the object */
typedef enum {
    WINDOW_HEIGHT    =    WINDOW_ATTR(ATTR_INT,    1)
    WINDOW_WIDTH    =    WINDOW_ATTR(ATTR_INT,    2)
    WINDOW_EVENT_PROC    =    WINDOW_ATTR(ATTR_FUNCITON_POINTER, 3),
} Window_attibute;
/* class private methods */

Pkg_private int window_init();
Pkg_private int window_destroy();
Pkg_private Xv_opaque window_set_avlist();
Pkg_private Xv_opaque window_get_attr();

FIG. 5

WindowClass.c /*   class declaration - shared by all instances of the class and
                   all instances of any subclass */
include "WindowPrivate.h"
/* Class definition structure, shared by all instances of the class */

```
Xv_pkg xv_window_pkg = {
        "Window Class",              /* class name */
        ATTR_PKG_WINDOW,             /* class seal */
        sizeof(Xv_window_struct),    /* size */
        &xv_drawable_pkg,            /* parent class */
        window_init,                 /* create / initialize method */
        window_set_avlist,           /* set method */
        window_get_attr,             /* get method */
        window_destroy,              /* destroy method */
        NULL,                        /* find method -- set to NULL */
};
```

FIG. 6

Window.c

```
Pkg_private int
window_init (parent,window_public,avlist)
      Xv_opaque      parent;
      Window_public          *window_public;
      Attr_avlist    avlist;
{

Window_private*window_private=(Window_private*)xv_alloc(Window_private);
      Xv_window_struct *win_public = (Xv_window_struct *) window_public;

*/ pointers between private and public */
      win_public->private_date = (Xv_opaque) window_private;
      window_private->public_self = (Xv_opaque) win_public;

/* other data structure initializations */
      window_private->parent = parent;
      /* parse create only attributes */
      /* create an X Window */
      return XV_OK;

}
/* this is the destroy routine called when an object is destroyed. XView employs a 4
phase destroy mechanism as shown below */
Pkg_private int
window_destroy(window_public, status)
      Window_public          window_public;
      Destroy_status status;
{
      Window_private *window_private = WINDOW_PRIVATE(window_public);
      Destroy_status status;

if(status == DESTRoy_CHECKING) {
              /* free any allocated resouces both locally and on the server */
      }
      else if (status = DESTROY_PROCESS_DEATH) {
              /* this process is going away do minimal cleanup */
      }
      else if (status == DESTROY_SAVE_YOURSELF) {
              /* if we have data to be saved for next time system is started do
                so now */
      }
      else if (status == DESTROY_CHECKING) {
              /* if we want to "veto" the destruction then return XV_ERROR */
      }
      return(XV_OK);
}
```

FIG. 7a

/* routine to query the value of an attribute of the object. No attributes of parent class are overwritten */

```
Pkg_private Xv_opaque
window_get(window_pubic,status,attr,args)
        Window_public              window_public;
        int                        *status;
        Window_attribute   attr;
        Attr_avlist        args;
{
        Window_private     *window_private = WINDOW_PRIVATE(window_public);
        XV_opaque      v;

switch(attr) {
        case WINDOW_WIDTH:
                        v = (Xv_opaque) window_private->width;
                        break;
        case WINDOW_HEIGHT:
                        v = (Xv_opaque) window_private->height;
                        break;
        case WINDOW_EVENT_PROC:
                        v = (Xv_opaque) window_private->event_proc;
                        break;
        case DRAWABLE_id:
                        v = (Xv_opaque) NULL;
                        ATTR_CONSUME(attrs[0]);        /* override an attribute defined
                        break;                          in a superclass */
        default::
                        xv_check_bad_attr(&window_pkg,attrs[0]) ;
                        break;
        }
        return(Xv_opaque) v;
}
```

FIG. 7b

```
/* set the attributes to the values specified */
Pkg_private Xv_opaque
window_set_avlist(win_public, avlist)
      Xv_Window         window_public;
      Window_attribute  avlist[];
{
      Window_private    *window_private = WINDOW_PRIVATE(window_public);
Attr_avlist             *attrs;

for(attrs - avlist; *attrs; attr_nest(avlist)) {
                        switch((int) attrs[0] {
                              case WINDOW_HEIGHT:
                                    window_private->height = (int) attrs [1];
                              case WINDOW_WIDTH:
                                    window_private->width = (int) attrs [1];
                                    break;
                              case WINDOW_EVENT_PROC:
                                    window_private->event_proc = (void (*)())
attrs[1];
                                    break;
                              default::

if(xv_check_bad_attr(&window_pkg,attrs[0]) ==
XV_ERROR)
                                    *status = XV_ERROR:
                                    v = (Xv_opaque) 0;
                                          break;
                        }
            }
            return XV_OK;
}
```

FIG. 7c

```
#include "WindowPublic.h"
...
window = xv_create(NULL,WINDOW,
                              WINDOW_HEIGHT,20,
                              WINDOW_WIDTH,20,
                              NULL);

(void) xv_set(window,WINDOW_EVENT_PROC,event_handler);
```

FIG. 8

METHOD FOR IMPLEMENTING COMPUTER APPLICATIONS IN AN OBJECT ORIENTED MANNER USING A TRADITIONAL NON-OBJECT ORIENTED PROGRAMMING LANGUAGE

This is a file wrapper continuation application of U.S. patent application, Ser. No. 07/515,427, Filed on Apr. 27, 1990, now abandoned entitled *Method and Apparatus for Implementing Computer Applications In An Object Oriented Manner Using A Traditional Non-Object Orient Programming a Language.*

BACKGROUND OF THE INVENTION

1. Field of the Invention

The present invention is related to the field of implementing object-oriented programming. Specifically, the present invention relates to the field of implementing object-oriented programming using an unmodified general-purpose programming language for a window-based system.

2. Art Background

There are many different views of what object-oriented programming is, but computer scientists and programmers agree on one thing: objects are components that combine the properties of procedure and data. All the action in object-oriented programming comes from sending events or messages between objects. Event sending is a form of indirect procedure call. The event specifies, among other things, the operation to be performed on an object. Objects respond to an event using their own procedures (called "methods") for performing operations. A set of events or messages defined as a uniform interface to objects is called a protocol. See, M. Stefik and D. G. Bobrow, "Object-Oriented Programming: Themes and Variations," *The AI Magazine*, Vol. 6, No. 4, Winter 1986, pp. 40–62. By object-oriented programming the present invention refers to data abstraction and inheritance. Data abstraction means that an object presents an interface to the application programmers through a set of methods. The manipulation of the internal data structures of the object and the implementation of these methods are completely transparent to the users of the object. Thus, the application programmer can change the underlying implementation of an objection without requiring the object users to change their procedure calls.

Inheritance means defining a new class as a variation of an existing class. A class is a tree structure describing one or more similar objects. As such, inheritance allows users to reuse existing software to build new software.

Many environments built using C are inherently object-oriented. A graphical user interface built on a window system is an example. However, C does not support object-oriented programming. See, L. Tesler, "Programming Experiences," *Byte*, August 1986.

Several approaches have been adapted to introduce object-oriented programming features to C. Some have explored the possibility of building modular design into C. See D. Kalyan, "Modular Programming in C: An Approach and Example," *SIGPLAN Notices*, Volume 20, No. 3, March 1985, pp. 9–15. The modular approach is based on static variables being placed in one file. Some approaches require a preprocessor such as objective-C. See, for example, S. Hook, *Objective-C Reference Manual, Version* 3.0, (Productivity Products International: December 1984). Yet other approaches attempt to define an entirely different language such as C++ in implementing object-oriented programming. See, B. Stroustrup, *The C++ Programming Language*, (Addison-Wesley: 1986).

The present invention implements object-oriented programming in C without modifying or extending the same. The object-oriented environment supported by the present invention includes X Window System Version 11 which supports the X11 protocol (see, R. W. Scheifler and J. Gettys, "The X Window System," *ACM Transactions on Graphics*, Volume 5, No. 2, April 1986, pp. 79–109) and the OPEN LOOK specification. OPEN LOOK provides a direct manipulation graphical interface into the UNIX system. (UNIX is a registered trademark of AT&T). For example, there is an application called filemanager that provides a visual interface into the UNIX file system giving files iconic representation. There are different iconic representations for executables, directories and data files. Using an input device such as a mouse, it is possible to click on a file and query its attributes or properties such as ownership and access rights. Under OPEN LOOK, it is also possible to double click on an iconic representation of the file and view it with an application. If the object is executable, then the program corresponding to the icon is run. See, "OPEN LOOK Graphical User Interface Functional Specification" (AT&T and Sun Microsystems, Inc.: 1988).

The X11 window system defines a distributed window protocol by which window servers and application processes communicate. A companion library called the X library provides a procedural interface to the protocol. An application causes procedure in the X library to send window management and drawing commands to the window server. The window server sends event notification to the application in response to user actions such as moving the mouse or typing on the keyboard and screened geometric changes. The window library queues events and packages them in a record structure. An application periodically polls the X library for the next event. See J. Gettys, R. Newman, R. W. Scheilfer, *Xlib-C Language Interface*, Massachusetts Institute of Technology, 1987. The X window system does not define any particular user interface style but provides a mechanism to support many interfaces. Although programmers can use X library to build applications, this library can be tedious and difficult to use correctly. Just handling the window manager conventions can require hundreds of lines of codes. The present invention is designed to be used with X window system and the X library to implement a user interface based on the OPEN LOOK specification. The present invention provides methods to partition data structures and procedures into various files. Furthermore, the present invention discloses methods to define new objects (instantiate the standard classes from part of the X library) to create user interface as part of the application rapidly.

The closest art known to the applicant is Xt Intrinsics Toolkit from Digital Electronic Corporation. See J. McCormack, P. Asente, "An Overview of the X Toolkit", *Proceedings of the ACM SIGGRAPH Symposium on User Interface Software*, October 1988, pp. 46–55, and J. McCormack, and P. Asente, "Using the X Toolkit, or How to Write a Widget", *Proceedings of the the Summer, 1988 USENIX Conference*, pp. 1–13. The present invention differs from from the Xt Intrinsics in the following ways: (1) the present invention has a uniform interface to all objects, while the Xt Intrinsics does not, (2) the present invention has chained event handlers while the Xt Intrinsics does not, and (3) the present invention defines its objects as comprising of attributes while the Xt Intrinsics defines its widgets as having resources. Although attributes and resources perform similar functions, i.e., referring to data elements within the object or widget, attributes do not necessarily refer to data elements within the object. Attributes of an object in the present invention could be a function call, for example, whereas a resource is by definition something that is inside of the widget, and (4) the present invention allows programmers to change the parent-child relationship while Xt Intrinsics does not.

It is therefore an object of the present invention to minimize the effort needed to write an X application by providing for a uniform user interface.

It is a further object of the present invention to provide a uniform interface to write an X application without modifying or extending the C language.

It is yet another object of the present invention to encourage user customization of X application through data abstraction.

It is yet another object of the present invention to allow users to reuse codes through inheritance.

SUMMARY OF THE INVENTION

An object oriented application comprising an hierarchy of application classes, each having a plurality of class methods, is created from a toolkit having a static class hierarchy including a number of standard classes, a number of public interface methods with interfacing attributes and a list for chaining class private methods to the public interface methods, a plurality of class definition source and header files defining the extended application classes, a plurality of class method source and header files implementing the class methods of the extended classes, and a plurality of object user source and header files implementing the objects users, using a traditional programming language that provides no support for object oriented programming. Together, the various files cooperate to achieve data abstraction and inheritance of object oriented programming, when the various files are compiled, linked executed.

BRIEF DESCRIPTION OF THE DRAWINGS

FIG. 5 is an example of using a private file and a public file in implementing data abstractions under the present invention.

FIG. 6 is a uniform class declaration embodying the unique five public methods of the present invention in achieving a uniform user interface.

FIG. 7a, 7b and 7c illustrate the code for accessing the functionality of the application through the opaque handle approach of the present invention.

FIG. 8 is an implementation of the present invention to display a window to the end users.

DETAILED DESCRIPTION OF THE INVENTION

NOTATION AND NOMENCLATURE

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reason of common usage to refer to these signals as bits, values, elements, object, symbols, characters, terms, numbers, or the like. It should be borne in mind, however, that all these and similar terms are to be associated with the appropriate physical quantities and are merely convenient labels applied to these quantities.

Further, the manipulations performed are often referred to in terms such as adding or comparing which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, there should be borne in mind the distinction between the method of operation in operating a computer and the method of computation itself. The present invention relates to method steps for operating a computer in processing electrical or other (e.g., mechanical, chemical) physical signals to generate other desired physical signals.

The present invention also relates to an apparatus for performing these operations. This apparatus may be specially constructed for the required purpose, or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

GENERAL SYSTEM CONFIGURATION

Figure 1:
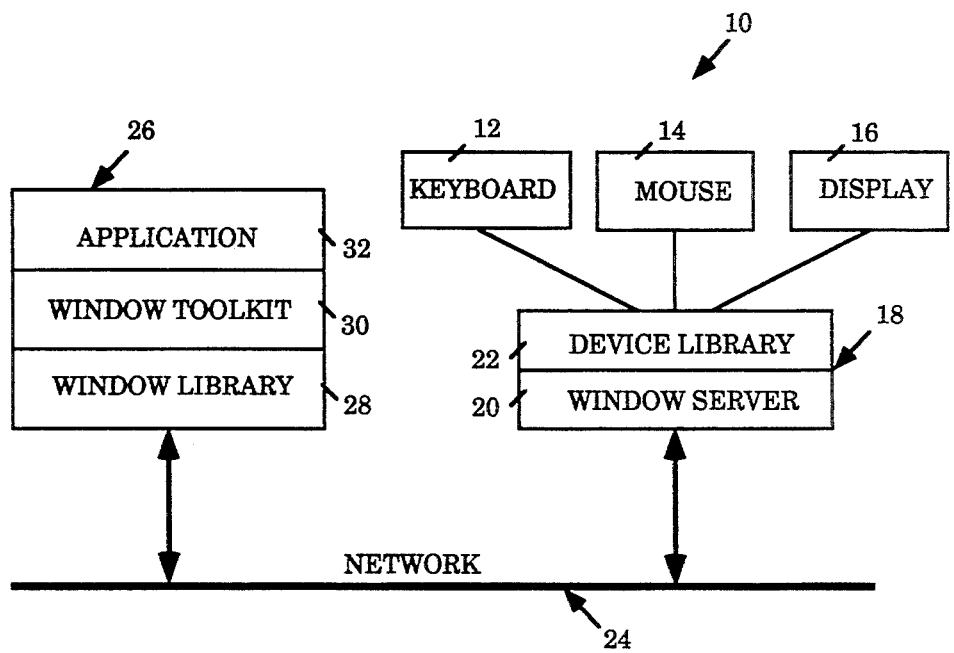
FIG. 1 illustrates the architecture of a server-based window system implementing the present invention.

FIG. 1 shows a typical window-based system for use with the present invention. Shown there, is a computer network 10 comprising 4 major components. The first of these is the input/output devices 12, 14, and 16 which are used to communicate information in appropriate structured form to and from the other parts of the computer network 10. Also shown, as a part of the computer network 10, is the second component—a server 18, including a window server 20 and a device library 22. The server 18 is typically found in most general purpose computers and almost all special purpose computers. Particular examples of suitable servers to fill the role of server 18 include machines manufactured by Sun Microsystems, Inc., Mountain View, Calif. Other computers having like capabilities may, of course, be adapted in a straight forward manner to perform the functions described below. It should be understood, however, only one server is shown in the computer network 10. In most computer networks, multiple servers may be coupled to the network for controlling other computers.

Also shown in FIG. 1, is the third component of the computer network 10, consisting of a link 24. Examples of typical links are cables, lease lines, fiberoptic connections and others. The fourth component of the computer network is an Application Program Interface 26 (API). The API 26 further comprises a window library 28, a window toolkit 30, and an application 32. The window library 28 provides a procedural interface to the client server protocol of the computer network 10. The application 32 calls procedures within the window library 28 to send window management and drawing commands to the server 18. An example of a window library that implements the X11 window system is the X library. See J. Gettys, R. Newman and R. W. Scheifler, "X lib-C Language Interface", Massachusetts Institute of Technology, 1987. The present invention comprises the window toolkit 30. The window toolkit 30 is based on a set of guidelines that allows one to program in an object-oriented fashion. The window toolkit 30 comprises components called objects. An object is a user interface component implemented by using procedural calls to the window toolkit 30 and the window library 28. The application 32 uses the window toolkit 30 to bind the objects together into a user interface and to link this user interface to functions implemented by the application. Under the present invention, the application programmer specifies objects (such as windows, menus, scrollbars and so on) to be created, using variable-length attribute-value list. See, "Varargs (3)" *SunOS Reference Manual*, (Sun Microsystems, Inc.: Revision A, May 9, 1988) (Part No.: 800-1751-10). The attribute-value list provides that the usual behavior for each object is already pre-defined and thus only the deviations from the default behavior need to be specified. As such, the use of pre-built user-interface components under the present invention eliminates boiler-plate code.

The application programmer then defines callback procedures which the window toolkit calls to notify the application of events or user actions. Finally, the application-specific code is registered or connected and allows the window toolkit to manage the application.

PROCESS DESCRIPTION

The present invention is an X 11-based user interface toolkit that is object-oriented, event driven, and implements the OPEN LOOK Graphical User Interface. See "OPEN LOOK Graphical User Interface Functional Specifications", (AT&T, Sun Microsystems, Inc., 1988). The present invention enables application programmers to use objects to create the user interface as part of the application rapidly.

The present invention is an event-driven toolkit. In the context of a distributed window system, the applications send requests to the server and receive events from the server. The present invention handles system events from outside the application/server protocol.

Figure 2:
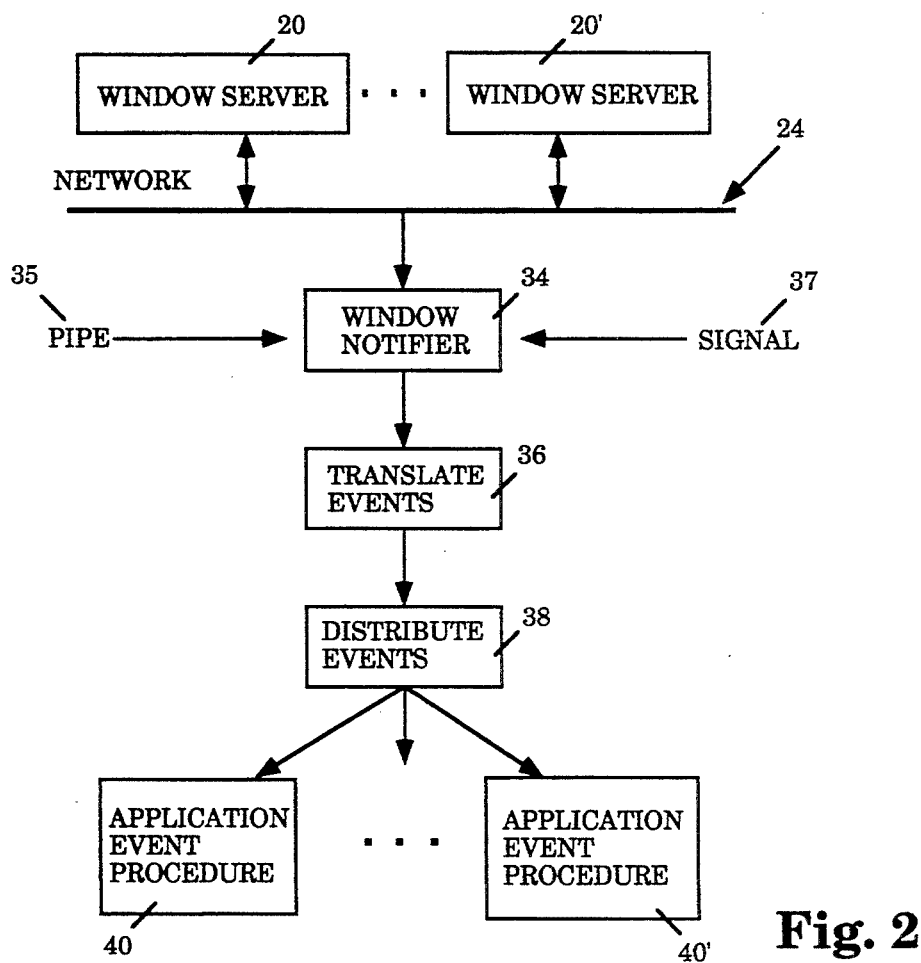
FIG. 2 is a process flow of the window notifier handling events from multiple window servers and multiple applications as part of the server-client process under a server-based window system.

This is accomplished by using a special callback procedure-event handlers. In FIG. 1, the window library 28 provides a procedural interface to the protocol. The application 32 calls event handlers in the window toolkit 30 to send window management and drawing commands to the server 18. The server 18 sends event notification to the application in response to user actions (such as moving the mouse 14 or typing on the keyboard 12). In FIG. 2, the event handlers for objects are registered, at initialization, with a central notifier 34. See, S. Evans, "The Notifier," *Proceedings of Summer USENIX Conference*, 1986. When events arrive from window servers 20 to 20' over the network link 24, the appropriate event handlers are invoked. The event handlers affect the state of the objects. One can change the state of the objects by using five public methods which shall be discussed in detail below. The event handlers are processed on a per instance basis. Some classes have a default event handler which is installed at initialization. More significantly, the event handlers of the present invention are chained. In contrast, the event handlers of prior art methods are unchained. Chained event handlers support the principles of object-oriented programming; it also allows classes to partition the handling of events received from the server 18. Referring again to FIG. 2, the notifier 34 then translates the event in step 36 and determines which object to distribute the event to in step 38, and finally calls the appropriate callback procedures in steps 40 to 40'. Chaining event handlers also allows objects to register callbacks with the notifier 34 for input on file descriptors 35, pseudo TTY's and for UNIX signals The present invention also implements the OPEN LOOK GRAPHICAL USER INTERFACE which is a functional specification that provides a standard look and feel for applications. This specification describes a large set of standard images that define the cursors, menus, icons and window declarations.

The present invention is an object-oriented system with static subclassing. It is object-oriented in that an application programmer can use building blocks or objects such as window, text, panels, icons and so on to construct an application. All the objects in the present invention share a common set of functions but retain the facility for variable length argument list of attributes.

Figure 3:
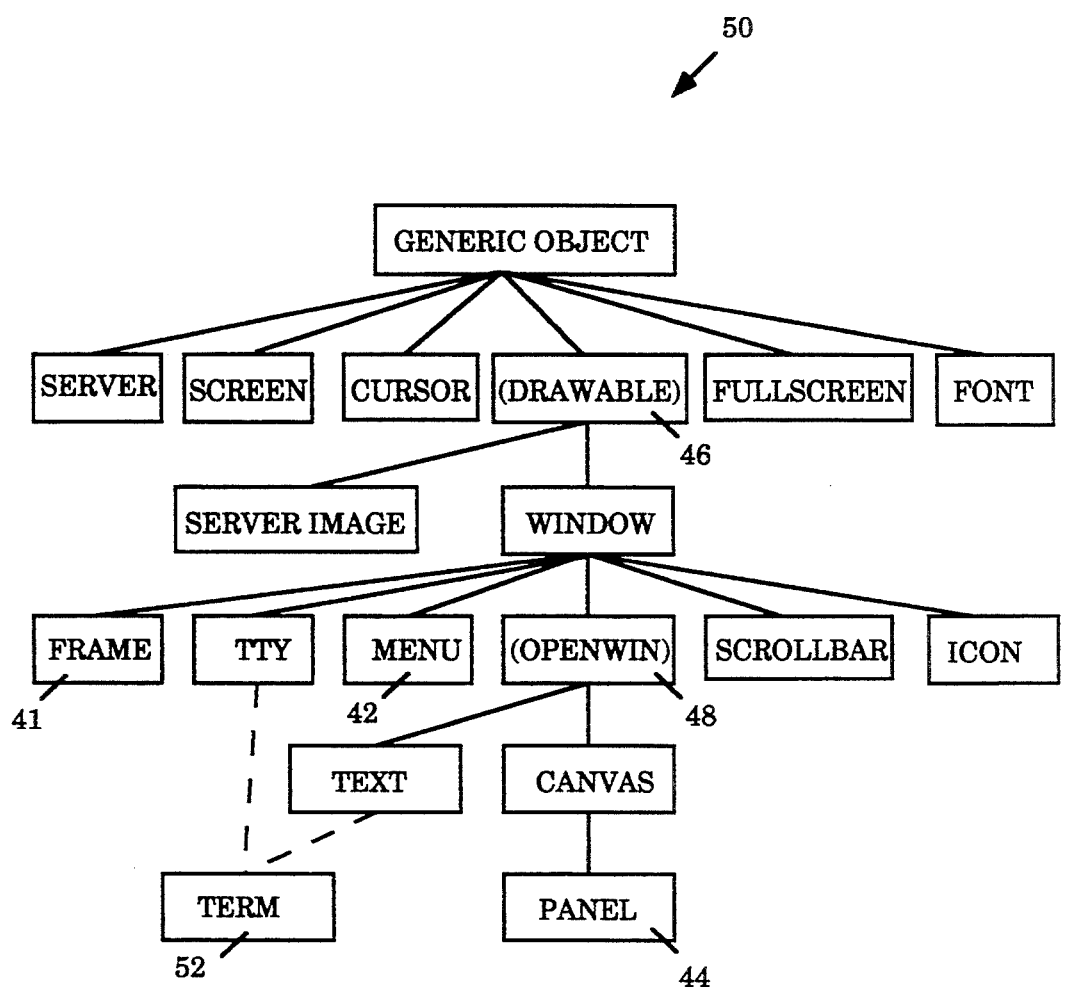
FIG. 3 is the structure (class hierarchy) of object used in implementing inheritance under the present invention.
Figure 4:
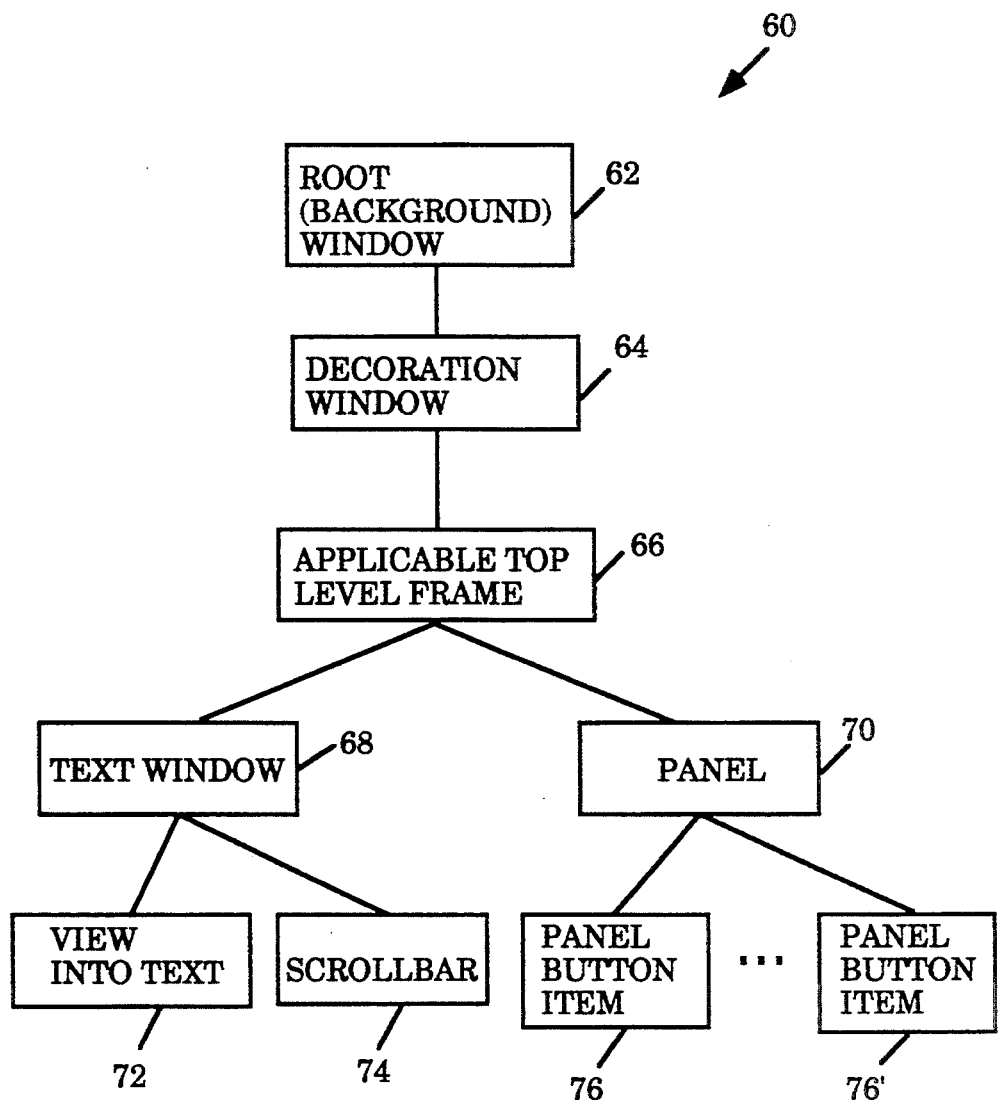
FIG. 4 is an example of using the tree structure of the objects under the present invention to implement code reuse.

FIG. 3 is the tree structure (class hierarchy) of the objects used in implementing inheritance under the present invention. From an object-oriented system's standpoint, there are two tree structures of interest in a window system. The first is the hierarchy of the types of objects. This static tree is a list of all the types of objects that can be created by the application programmer using the window toolkit. Each type of object is known as a class. This static tree represents how the various classes share data and functions. The second hierarchy is the instance tree. An instance tree is created when classes are instantiated and linked. The instance tree is what the user of the window system actually sees on the screen. The instance tree is a dynamic structure and is manipulated by the object user. An application typically consists of a tree of instances rooted at the main application window. This window, in turn, is a trial of the root or background window.

Referring again to FIG. 3, shown there is an instance tree of a generic object and the relationships between the classes. For example, panel 44 is a subclass of Canvas, which is a particular subclass of a window which, in turn, is a particular subclass of the generic object.

The classes shown in FIG. 3 are further subdivided into composite and primitive classes. Classes such as Frame 41, menu 42, panel 44 and Term 52 are composite classes, while all the other classes are primitive. An instance of a composite class can be either a leaf or an internal node in an instance tree. As an internal node, a composite instance may have several child instances. Composite instances are responsible for the geometry management of its children, and in some cases any drawings to the children are clipped to the boundaries of the parent. The menu button instances of a primitive class are instances of a composite class.

DATA ABSTRACTION

The present invention implements a static subclassing model. At compile time, the class hierarchy and the compositions of the class are defined and cannot be changed at run time. This means that both no new classes can be created and no new properties can be added to a class at run time. Each time an object is instantiated from a class, the caller gets an opaque handle to the instantiated object. The opaque handle is a handle to an object structure, but the user of the handle does not know the definition of the data it represents. As such, the object user cannot access the internal data of the object. The object possesses certain attributes that define the behavior it will exhibit to the users of the object. The present invention provides only 5 public methods to access the attributes of the objects: objects are created by using a "create" function, (xv_create); objects are located and shared by using a "find" function, (xv_find); if no common object is located, (xv_find) reverts to (xv_create). The attributes of an object may be queried by using (xv_get), while they may be changed by using (xv_set). When the object is no longer needed, it is destroyed by using (xv_destroy). Once an application programmer creates an object, he can query the object to determine the state of its attributes or he can change the state of an object by setting the values of the attributes. The users of the object do not know how the object implements or affects the required change. The exposed types of the attributes have nothing to do with the actual implementations thereof. Thus, the present invention hides the details of the manipulations and implementations of the objects from the end users, thus achieving data abstraction. Data abstraction is reinforced by exposing one public header file to users of the object.

Under the present invention, data abstraction is implemented by maintaining both a private, complete definition of each object, and a public, incomplete definition as illustrated in FIG. 5. Shown there are two header files for the example Window. The private header file for the window, WindowPrivate.h, contains the real definition used internally by the object. The public header file, WindowPublic.h, contains only those definitions required by the applications that use the object. In the public header file are various opaque handles—opaque windows—which point to the object structure for Window but do not have access to the real definition of the data it represents. It follows that data abstraction is achieved because the implementation of an object from applications that use the object has been hidden from the object user.

DEFINING A NEW CLASS

To define a new class requires at least two header .h files and two .c files. For example, to create a class called Window requires a WindowClass.c, Window.c, WindowPrivate.h and WindowPublic.h file. The WindowClass.c file contains the class declarations as shown in FIG. 6. The class declarations as illustrated in FIG. 6 are shared by all instances of the Window class and all instances of any subclass of window.

The five public interface methods defined earlier are the only public methods of any object. These methods call the appropriate sets of private internal functions in each class' class structure. More than one internal function may get called when a public method is invoked, since the private methods are chained in a list with the corresponding superclass and subclass private functions. This chaining is automatic for all the procedures in the class definition. This is also referred to as superclass chaining. There are two variants of superclass chaining: upward and downward superclass chaining. In upward superclass chaining, all the private chain methods are called in subclass to superclass order all the way to the base class. (For example, in FIG. 3, the upward chaining would be in the order panel—canvas—open win-drawable-generic). In downward superclass chaining, the private methods are called in superclass to subclass order. (Referring again to FIG. 3, downward superclass chaining would be in the order of generic-drawable-window-open win-canvas-panel).

A class can inherit all the private functions of its superclass without adding any of its own by inserting a NULL in the appropriate place in the class declaration structure. See, for example, the last line of the code in the class declarations as illustrated in FIG. 6. A class automatically inherits behavior from its superclass by not processing the attribute whose behavior the class wants to inherit. Additionally, a class may override the behavior of an attribute by acting on it and then deleting it from the attribute list before its superclass examines the attribute list. Among the five public interface methods described earlier, (xv_set) and (xv_get) are downward chained.

In FIG. 7a, 7b and 7c are the implementation files for creating a new object Window, Window.c. The implementation files comprise five individual files. Another application may not be put under one single file. The five interface methods map to private methods in the following ways.

1. Create as object of type class, with the specified parent and with its attributes set to the values indicated in the attribute value list. The method invocation is:

Xv_object=xv_create (parent, class, attribute-value pairs).

The parent is used to insert the instantiated object in the correct place in the object tree. All the init procedures are called in downward superclass chaining order and the create time attributes are parsed at that time. Create time attributes are those attributes that only have meaning at create time. Then all get routines are called in upward superclass chaining order to parse the remaining attributes and finally, all the set routines are called with the only attribute XV_END_CREATE in downward superclass order to allow for post creation processing.

2. Find an object of type class, with parent parent and matching the attribute value list specified. The method invocation is:

Xv_object xv_find (parent, class, attribute-value pairs)

The find procedures of the objects are called in upward superclass chaining order. If the find fails, then this reverts to a create.

3. Get the values of the attributes and put data into the structures provided or return a pointer to the structure. The present invention currently supports both models. The method invocation is:

Xv_opaque xv_get (object, attribute-value pairs)

The set procedures of the objects are called in the upward superclass chaining order.

4. Set the values of the attributes of the object to the values specified in the attribute value list. The method invocation is:

Xv_opaque xv_set (object, attribute-value pairs)

The set procedures of the objects are called in upward superclass chaining order.

5. Destroy the object. The method invocation to destroy an object is:

int xv_destroy (object)

The return value indicates whether or not the object was actually destroyed. The destroyed procedures of the classes are called in upward superclass chaining order.

The WindowPublic.h file in FIG. 5 is the only file a user of the object or creator of a subclass of the object really needs to use. This approach exposes the same file to both new object programmers and object users. This results in a uniform user interface for the window-based system.

INHERITANCE

Under the principle of inheritance in object-oriented programming, it is possible to define a new class as a variation of an existing class. The new class may specialize on the old one or extend the features in the old one. The new object is called the subclass of the old, and the old object is called the superclass of the new class. Each class adds features by creating new attributes or it can override attributes of the superclass by modifying the attribute-value list before they are processed by the superclass. In the preferred embodiment of the present invention, a single class inheritance has been implemented. Under a single class inheritance, a single class has only one superclass. This is in contrast with multiple class inheritance, where a class may have more than one superclass. The structure of the single class hierarchy in the preferred embodiment of the present invention is illustrated in FIG. 3. The advantage arising from code reuse under the principle of inheritance is illustrated in FIG. 8. Shown there, are few lines of code designed to create a window object on a display with height and width of 20 pixels by 20 pixels. The call, xv_set () adds an event handler to the object. Note also that the root window is the parent. The portion ". . . " refers to the public header file, WindowPublic.h, as illustrated in FIG. 5. By definition of the present invention, the public file contains all the definitions necessary for creating an application which will use the object and all the information for anyone wishing to subclass as well. As such, creating a new class (here, a window object) requires fewer and fewer codes because existing codes (here, the public file) are reused. Therefore, by adhering to the framework of partitioning events into the various files, one can create the user interface as part of any application rapidly.

COMPARISON WITH CLOSEST PRIOR ART

The closest prior art is Xt Instrinsics (Xt) which is also a toolkit for implementing user interface in X 11 based window system with unmodified C. The present invention differs from Xt in several significant respects: (1) Xt does not have a uniform interface to all objects, while the present invention does. Application programmers under Xt use a different set of header files from that of the object user, while the same set of header files are used regardless of whether the user is an application programmer or an object user; (2) Object users under Xt can access any functions the object designer makes public, but object users under the present invention are limited to the five public methods described above; (3) Xt does not have chained event handlers, while the present invention does; (4) The association of objects under Xt is predetermined and cannot be changed. In other words, once a person specifies a parent, it cannot be changed thereafter. On the other hand, the present invention permits its attributes to change the association among the objects because the attributes are not limited to elements within an object. For instance, the attributes of an object in the preferred embodiment of the present invention may refer to function call. Below are code fragments showing the difference between the Xt and the present invention when one wishes to call a resize procedure for a window object:

Xt: object→core. resize(); and

Present invention: xv_set (object, WIN_RESIZE_PROC, 0);

Although the present invention has been described with reference to particular window examples in FIGS. 1-8, it will be appreciated by one skilled in the art that the present invention may be implemented in any one of a number of various window-based systems. Similarly, particular object, class hierarchy, or format of files illustrated in the figures are only representative of one of many possibilities of object-oriented configurations which may utilize the present invention. Moreover, it will be understood that the figures are for illustration only and should not be taken as limitations upon the invention. It is contemplated that many changes and modifications may be made, by one of ordinary skill in the art, to the materials and arrangements of the elements of the invention without departing from the spirit and the scope of the invention as disclosed above.

I claim:

1. In a computer system comprising a C programming language compiler and its runtime libraries, wherein said compiler and its runtime libraries are used to create applications having a number of object creators and users which create and use objects, a method for creating and using an object by an object creator and at least one object user in a manner that relieves the object creator from actually having to implement the object, and shielding the object's implementation from the object creator and the at least one object user, said method comprising the steps of:

a) providing an object oriented toolkit comprising a static class hierarchy having a least one root class, said root class having a plurality of public interface methods for interfacing between a plurality of program calls and a plurality of private class methods, said program calls being made by object creators and users for creating objects using said class hierarchy and manipulating the created objects, said private class methods being methods of classes subclass to said root class for creating and manipulating class instances of said classes and having a corresponding relationship to said public interface methods, said root class further having at least one list for correspondingly chaining said private class methods to said public interface methods by their class orders, said at least one list being automatically updated whenever one of said classes subclass is defined and added to said static class hierarchy, each of said public interface methods invoking at least its correspondingly chained private class methods in a predetermined one of two orders whenever itself is invoked by one of said program calls;

b) creating a first class subclass to said root class by compiling at least a first source file having a first and a second header file into at least a first object file, and linking at least said first object file into a first executable file, said first and additional source files, if any, comprising a first data structure and a first plurality of functions, said first data structure defining class data common to all class instances of said first class including a first class identifier identifying said first class, and first parent identifier identifying said root class as said first class's superclass, said first plurality of functions implementing the private class methods of said first class, each of said first plurality of functions being executed when the private class method of said first class it implements is invoked, said first header file comprising a second data structure defining class instance data for a class instance of said first class including an opaque handler for locating and shielding the class instance of said first class, each of said opaque handlers of class instances of said first class being instantiated and returned by a first of said first plurality of functions for creating a class instance of said first class when said first function of said first class is executed, said second header file comprising a third data structure defining a first plurality of interfacing attributes of said first class and a first plurality of function declarations defining said first plurality of functions, said first plurality of interfacing attributes being correspond to and shielding said class instances' data of said first class;

c) creating the object creator by compiling at least a second source file having at least said second header file into at least a second object file, and linking at least said second object file into a second executable file, said second source file comprising a first of said program calls to a first of said public interface methods to create the object as a first class instance of said first class using said first parent identifier, said first class identifier, and selectively said first plurality of interfacing attributes, and to obtain a first opaque handler for said created first class instance;

d) executing the object creator by executing said second executable file, causing said first program call to be made, which in turns leads to said first public interface method and its correspondingly chained private interface method of said first class to be invoked said first executable file and said first function of said first class to be executed, said first class instance to be created, said first opaque handler to be instantiated and returned, thereby creating the object without requiring the object creator to actually implement the object and shielding the implementation of the object from the object creator.

2. The method as set forth in claim 1, wherein, the object creator is also one of said at least one object user of the object created;

said second source file in said step c) further comprises a second of said program calls to a second of said public interface methods to manipulate the object using said first opaque handler and selectively said first plurality of interfacing attributes; and said execution of said second executable file in said step d) also causes said second program call to be made, which in turns leads to said second public interface method and its correspondingly chained private interface method of said first class to be invoked, said first executable file and the implementing function of the invoked private interface method to be executed, said first class instance to be manipulated, thereby using the object but shielding the implementation of the object from the object creator/user.

3. The method as set forth in claim 1, wherein, said method further comprises the steps of:

e) creating a first of said at least one object user by compiling at least a third source file having at least said second header file into at least a third object file, and linking at least said third object file into a third executable file, said third source file comprising a second and a third of said program calls to a second and a third of said public interface methods respectively, said second program call being made to locate the object using said first parent identifier, said first class identifier, and selectively said first plurality of interfacing attributes, and to obtain said first opaque handler, said third program call being made subsequently to a third of said public interface methods to manipulate the object using said first opaque handler and selectively said first plurality of interfacing attributes;

f) executing said first object user by executing said third executable file, causing said second program call to be made, which in turns leads to said second public interface method and its correspondingly chained private interface method of said first class to be invoked, said first executable file and the implementing function of the invoked private interface method to be executed, said first opaque handler to be returned, then, said third program call to be made, which in turns leads to said third public interface method and its correspondingly chained private interface method of said first class to be invoked, said first executable file and the implementing function of the invoked private interface method to be executed, said first class instance to be manipulated, thereby using the object but shielding the implementation of the object from said first object user.

4. The method as set forth in claim 1, wherein, said second header file further comprises a fourth data structure defining a plurality of pointers for linking a class subclass to said first class to said first class.

5. The method as set forth in claim 4, wherein, said step b) further comprises creating a second class subclass to said first class by compiling at least a third source file having a third and a fourth header file into at least a third object file, and linking at least said third object file into a third executable file, said third and additional source files, if any, comprising a fifth data structure and a second plurality of functions, said fifth data structure defining class data common to all class instances of said second class including a second class identifier identifying said second class, a second parent identifier identifying said first class as said second class's superclass, said second plurality of functions implementing the private class methods of said second class, each of said second plurality of functions being executed when the private class method of said second class it implements is invoked, said third header file including said second header file, and comprising a sixth data structure defining class instance data for a class instance of said second class including an opaque handler for locating and shielding the class instance of said second class, each of said opaque handlers of said class instances of said second class being instantiated and returned by a first of said second plurality of functions for creating a class instance of said second class when said first function of said second class is executed, said fourth header file including said second header file, and comprising a sixth data structure defining a second plurality of interfacing attributes of said second class and a second plurality of function declarations defining said second plurality of functions, said second plurality of interfacing attributes being correspond to and shielding said class instances' data of said second class;

said first of said program calls to said first of said public interface methods in said second source file in said step c) is made to create the object as a second class instance of said second class using selectively said second class identifier, said second parent identifier, and selectively said second plurality of interfacing attributes, and to obtain a second opaque handler for said created second class instance;

said execution of the object creator by executing said second executable file in said step d) causes said first program call to be made, which in turns leads to said first public interface method and at least its correspondingly chained private interface method of said second class to be invoked, said second executable file and said first of said second plurality of functions to be executed, said second class instance to be created, said second opaque handler to be instantiated and returned, thereby creating the object without requiring the object creator to actually implement the object and shielding the implementation of the object from the object creator.

6. The method as set forth in claim 5, wherein, said fifth data structure of said third and additional source files, if any, in said step b) further comprises an inheritance indicator indicating one of said first plurality of functions of said first class is to be inherited as the implementation function for one of the private methods of said second class.

7. The method as set forth in claim 1, wherein,
said computer system further comprises an event notifier/distributor subsystem;
said application is an event driven application;
said first plurality of interface attributes comprise a functional interface attribute for associating an event handling procedure with a class instance of said first class.

* * * * *